United States Patent [19]
Shamblin et al.

[11] Patent Number: 5,943,239
[45] Date of Patent: Aug. 24, 1999

[54] METHODS AND APPARATUS FOR ORIENTING POWER SAWS IN A SAWING SYSTEM

[75] Inventors: Wayne A. Shamblin, Fort Worth; David L. McAdoo, Alvarado, both of Tex.

[73] Assignee: Alpine Engineered Products, Inc., Pompano Beach, Fla.

[21] Appl. No.: 08/950,528

[22] Filed: Oct. 14, 1997

Related U.S. Application Data

[63] Continuation of application No. 08/408,539, Mar. 22, 1995, abandoned.

[51] Int. Cl.$^6$ ............................................. G06F 19/00
[52] U.S. Cl. ............................. 364/474.02; 364/474.09
[58] Field of Search ..................... 364/474.01, 474.02, 364/474.09, 474.16, 474.17, 474.18; 83/404.1, 404.2, 732

[56] References Cited

U.S. PATENT DOCUMENTS

| | | | |
|---|---|---|---|
| 2,455,097 | 11/1948 | Scianna | 83/404.1 |
| 2,627,880 | 1/1953 | Johnson | 143/6 |
| 3,288,181 | 11/1966 | Fellman | 144/1 |
| 3,374,813 | 3/1968 | Tillery | 83/404.1 |
| 3,380,494 | 4/1968 | Mayo | 83/404.1 |
| 4,098,310 | 7/1978 | Sanford et al. | 144/3 R |
| 4,277,998 | 7/1981 | Mayo | 83/404.1 |
| 4,467,684 | 8/1984 | Thorsell | 83/404.1 |
| 4,467,685 | 8/1984 | Thorsell | 83/478 |
| 4,516,675 | 5/1985 | Koskovich | 198/654 |
| 4,676,129 | 6/1987 | Blanco | 83/404.1 |
| 4,770,076 | 9/1988 | Wilson | 83/404.1 |
| 4,874,996 | 10/1989 | Rosenthal | 144/385 |
| 5,315,906 | 5/1994 | Ferenczi et al. | 83/76.9 |

FOREIGN PATENT DOCUMENTS

| | | | |
|---|---|---|---|
| 732524 | 6/1955 | United Kingdom | 83/404.1 |
| 1375964 | 12/1974 | United Kingdom | 83/13 |

OTHER PUBLICATIONS

Timber Mill® 6–20G brochure (undated).
Timbermill 6–20 brochure (undated).
De Pauw International Quadri–Cut Saw brochure (undated).
MiTek Easy–Set™ Component Saw brochure (1969).
Advanced Component Systems, Inc. Truss–Cut A400 brochure (1992).

(List continued on next page.)

*Primary Examiner*—Paul P. Gordon
*Attorney, Agent, or Firm*—Crutsinger & Booth

[57] ABSTRACT

A sawing system is provided having a material conveyor for moving lengths of wood stock through the sawing system. According to one aspect of the invention, the material conveyor is preferably inclined upward from a frontal loading end to facilitate the loading of wood stock. The material conveyor is also preferably adjustable to accommodate different lengths of wood stock. According to another aspect of the invention, the sawing system has at least first and second power saws on one side of the material conveyor and at least third and fourth power saws on the opposite side of the material conveyor. Each of the four power saws is supported for independent angular movement of its saw blade about a pivot axis that is offset from the plane of the saw blade and parallel to the direction of the movement of the lengths of wood stock on the material conveyor. At least one of the first and second power saws is supported for horizontal movement relative to the material conveyor. At least one of the third and fourth power saws is supported for horizontal movement relative to the material conveyor. The pivot axis of each of the first and third power saws is positioned above the conveying plane of the material conveyor form making top angled cuts in the lengths of wood stock moved on the material conveyor. According to a further aspect of the invention, an algorithm is provided for computing a position of the power saws to make desired angled cuts in the ends of the lengths of wood stock.

18 Claims, 7 Drawing Sheets

OTHER PUBLICATIONS

Auto–Omni Saw brochure, Engineering Services Company, Rochester, MN (undated).

"Users Continue to Heap Praises on ESCO's Auto–Omni Saw, Jet–Set Jiggin system", *Automated Builder,* Apr. 1993.

AutoMaster Sales Brochure by Alpine Engineered Products, Inc. (undate).

Guide to the Operation and Maintenance of The Automaster Component Cutter by Alpine (undated).

"Guide to the Operation and Maintenance of the Master Component Cutter" by Clary (undated).

Brochure entitled "Our Finest Effort . . . The Clary Master" (undated).

Mastersaw Truss Fabrication Saw by Multinail (undated).

The B–Series . . . The Truss–Cut Component Saw of Choice . . . brochure by ASI Industries (undated).

DeSauw Combination Web–Cut Model WA500, DeSauw Combination Floor/Web–Cut Model FWA500 brochure by ASI Industries (undated).

DeSauw Truss–Cut A–Series Models A400, A500, and A600 and DeSauw Truss–Cut B–Series brochure by Automation Sales, Inc. (undated).

Tee–Lok Proven Performance brochure by Tee–Lok Corporation (undated).

Mi–Tek 3000 Henry Chambers 0, MiTek Industries, Inc., 1993, *Circle Reader Service,* #111 & #112.

DePauw International, The K–80 and K–84 Saws brochure (undated).

Brochure entitled "Questions for Increasing Productivity" by Speed Cut™ (undated).

TimberMill® 4–14 brochure by Speed Cut™ (undated).

Timber Mill® 4–14 "The ultimate in Web Saw cutting systems" brochures by Advanced Equipment Systems, Inc., Sep., 1994.

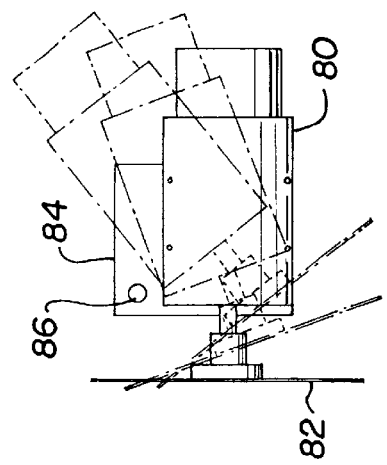
Fig. 4
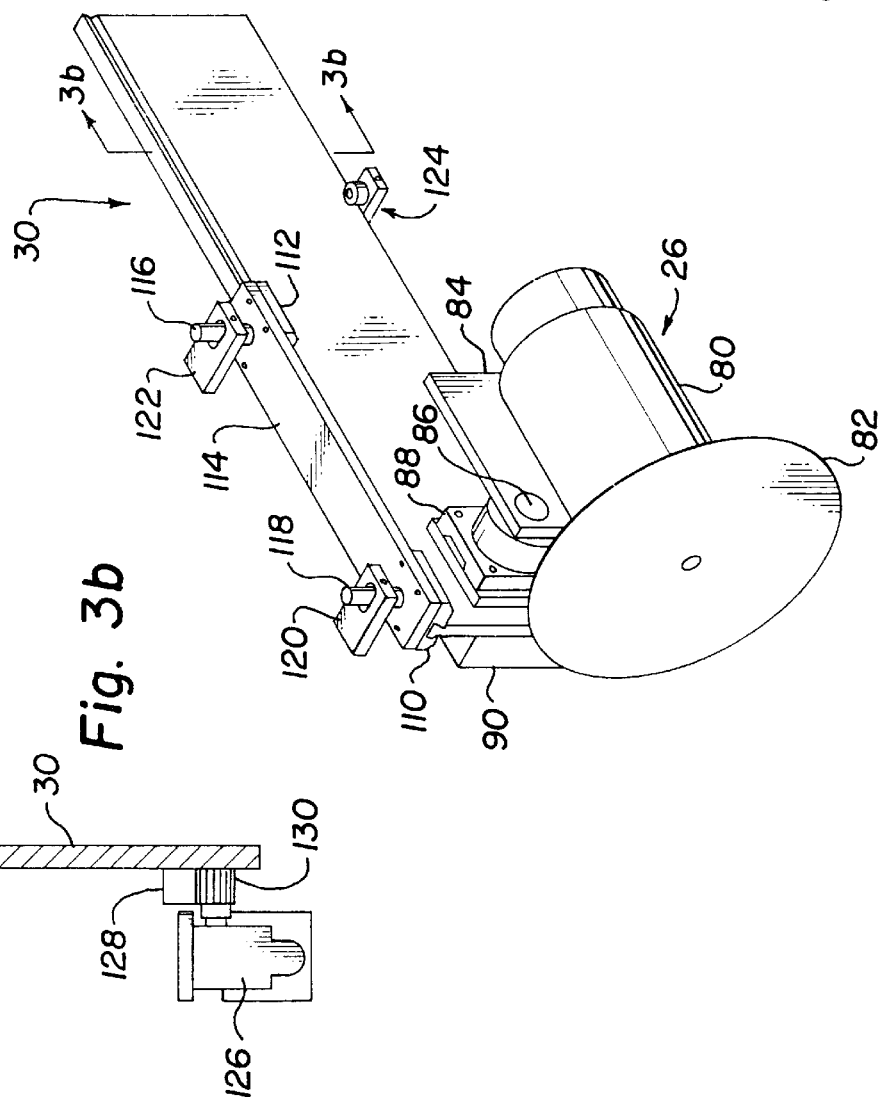
Fig. 3a
Fig. 3b

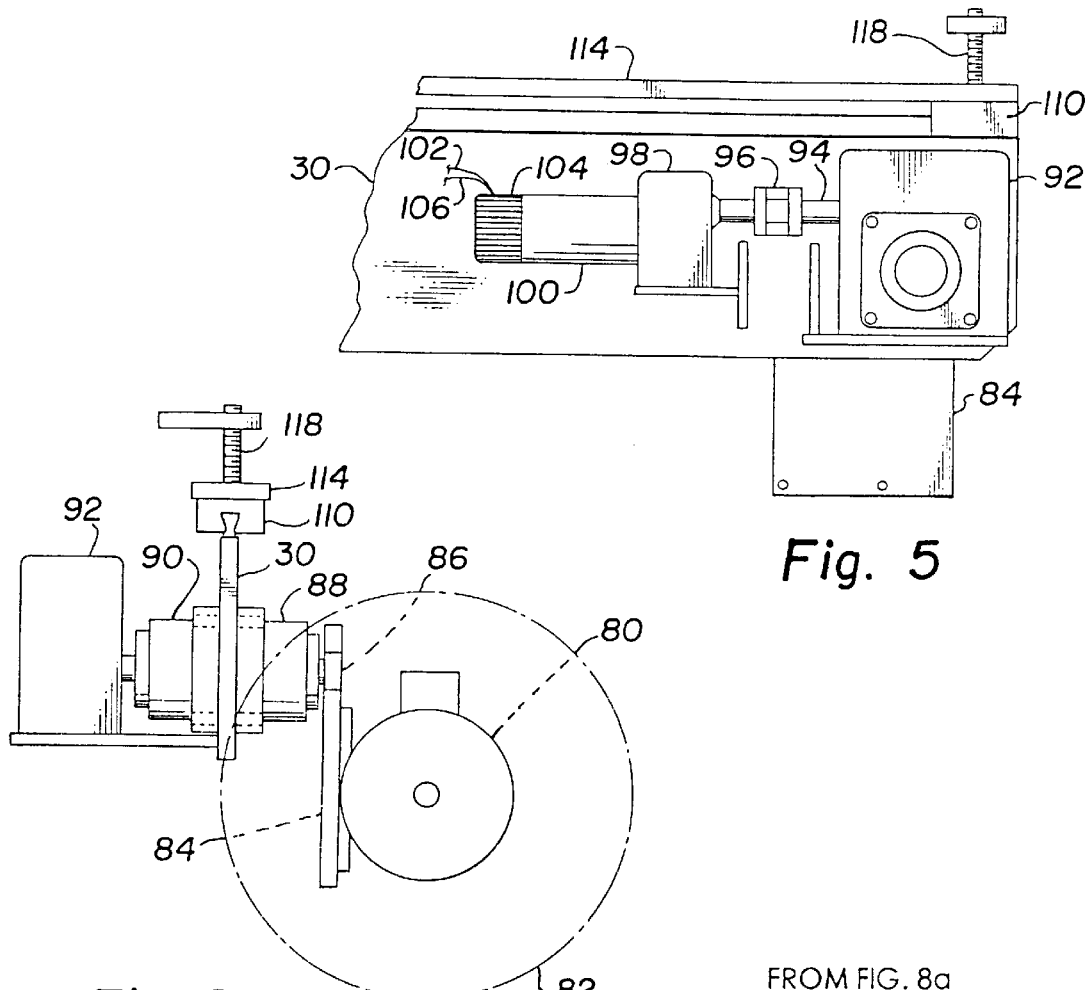
Fig. 5
Fig. 6
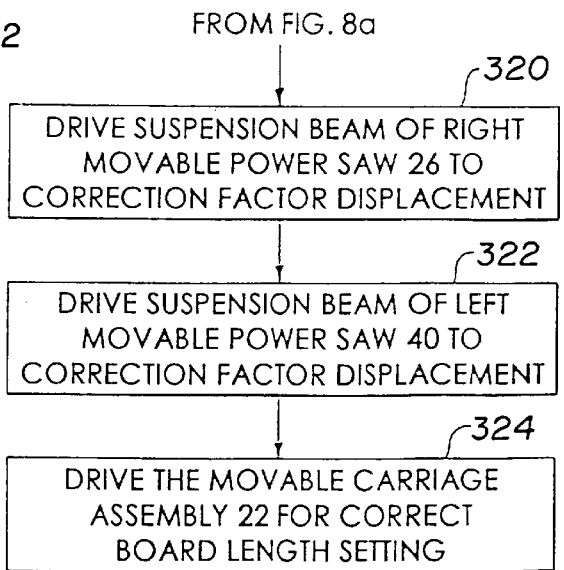
Fig. 8b

METHODS AND APPARATUS FOR ORIENTING POWER SAWS IN A SAWING SYSTEM

This application is a continuation of application Ser. No. 08/408,539, filed Mar. 22, 1995 now abandoned.

TECHNICAL FIELD OF THE INVENTION

The present invention relates in general to automated sawing systems, and more particularly to techniques for orienting a number of power saws through which wood stock is moved to cut various angles therein.

BACKGROUND OF THE INVENTION

Automated sawing machines and systems are well known and readily available for a host of different applications. For example, there are many types of computer-controlled sawing systems to which lumber is fed so that it is cut in prescribed lengths and at various angles, according to a cut list entered into the computer. In many prefabricated wood structures, various components thereof are cut and pre-assembled, using automated sawing machines to cut the lumber to various lengths and at various angles at the ends of the pieces. As one example, the web and chord components of wooden trusses are often cut and pre-assembled at a factory and then transported to the construction site for building floors, roof structures, and the like.

Automated sawing systems for cutting the outer chord pieces and the inner web pieces of trusses are highly developed and automated to provide accurate, high speed cutting operations. One such cutting system is known as the "Automaster" saw, model 341, obtainable from Alpine Engineered Products, Inc., Grand Prairie, Texas. In such type of saw, the system is computer controlled to move a number of individual saws and simultaneously cut both ends of a board to desired angles in a single pass through the system. A board is manually loaded on a frontal chain-type material conveyor which transports the board to the cutting area of the system. The board is fed by the material conveyor between a pair of left-hand mounted saws and a pair of right-hand mounted saws, so that the ends of the board can be cut substantially simultaneously. The right-hand set of saws are mounted on a track and can be moved to accommodate different lengths of boards. Further, each of the individual saws can be moved at different angular orientations with respect to the material conveyor so as to saw each end of the board at desired angles as the board moves through the sawing system.

In such type of system, each circular saw blade is mounted directly to an electric motor, and the motor is rigidly fixed to the planar face of a large gear-driven sprocket wheel. The large sprocket wheel is not circular, but is C-shaped with a portion of the middle removed so that the end of a board to be cut can be moved through the saw blade without interference by the sprocket wheel. The inside curved surface of the C-shape wheel is mounted on bearings so that the wheel and the power saw mounted thereto can be rotated about an axis that passes parallel and extends through the plane of to the front face of the saw blade. In this manner, the saw can be angled to different positions and be able to cut through a single point on the board without any corrective horizontal movements of the saw. Importantly, this saw's pivot axis is not physically embodied by a shaft, but rather is in the geometric center of the C-shaped sprocket wheel.

The angular orientation of the saw blade about the pivot axis can be oriented to different positions by turning the sprocket wheel with a gear-drive mechanism. The large sprocket wheel is mounted for rotation with respect to a complicated bearing arrangement that requires lubrication frequently to prevent galling or wear to the curved bearing surfaces. Any wear in the gear or bearing surfaces leads to inaccuracy in the precise angular positioning of the saw blade, as well as slight play or wobble of the saw blade during actual sawing. Further, the entire C-shaped sprocket wheel and saw motor can be moved vertically by way of an electric screw-driven arrangement. In like manner, the entire set of right-hand mounted saws can be moved horizontally by a gear driven assembly. Only the right-hand set of power saws needs to be moved horizontally, toward or away from the left-hand set of power saws to accommodate different lengths of boards.

With regard to the sprocket wheel arrangement for angling each saw blade, the motor and saw blade are fixed to the sprocket wheel such that when moved through an arc of angles, an axis of pivotal movement is parallel to and extends through the plane of the front face of the saw blade. In this manner, to change the saw cut from a thirty degree angle to a forty-five degree angle, only the sprocket wheel and attached saw require angular movement, without a corresponding vertical adjustment of the respective electric screw-mechanisms.

As further noted in connection with the Automaster saw system identified above, the in-feed chain conveyor is constructed such that an operator places a board on an upwardly-angled portion of the conveyor where such board is carried to a knee point, at which point the conveyor is oriented horizontally to carry the board laterally into the sawing system. A chain-driven hold-down assembly. holds the board to the material conveyor during horizontal movement of the board into the sawing system. With this type of structure, while it is convenient for the operator to load the lumber on the conveyor without having to lift it shoulder high, when the board is carried over the transition knee point to the horizontal part of the conveyor, the board often tumbles or is rolled before it is clamped and thus becomes misaligned with respect to the left-hand set of saws and the right-hand set of saws.

The in-feed chain conveyor of the Automaster saw has two sets of parallel feed chains for carrying the board into the sawing system. One chain conveyor can be horizontally moved along the frame with the one set of power saws, toward or away from the other set of power saws, to accommodate different lengths of boards. In order to accommodate short boards, i.e., about two feet and shorter, the pair of parallel chain conveyors must be moved together, adjacent each other, so as to be able to move the short board between the left-hand set of saws and the right-hand set of saws. In practice, it has been found that because of the drive bearing arrangement at the rear of the conveyors and the chain-tensioning linkage at the frontal part of each chain conveyor, such conveyors cannot be moved as close to each other as would be needed to cut very short pieces of wood.

As noted above, one set of power saws is movable horizontally along the frame, as is the corresponding hold-down mechanism and chain conveyor. The power drive for the hold-down mechanism and the movable chain conveyor is a long square drive shaft that extends essentially the length of the saw system. Various in-feed conveyors are driven by the drive shaft using a square tubular member through which the drive shaft extends to rotate the tubular member. The tubular member transfers the torque to the conveyor drive gears. The metal-to-metal driving engagement between the square shaft and square tubular member causes wear, thus requiring eventual replacement. To replace the worn parts, the procedure is time consuming, as much of the in-feed conveyors require disassembly and then corresponding assembly using new, and often expensive parts.

In view of the foregoing, it can be seen that a need exists for further improvements in automated sawing systems to reduce costs, maintenance, increase the speed of operation, and generally provide an overall improvement with respect to accuracy and efficiency.

SUMMARY OF THE INVENTION

The foregoing shortcomings and disadvantages are either eliminated or substantially reduced by the use of one or more of the aspects of the present invention. In accordance with a preferred embodiment of the invention, two of the four power saws are mounted to respective suspension beams by linear bearings for horizontal movement. However, all four saws can be positioned to different angular positions to cut respective angles in the truss boards. The suspension beam is oriented horizontally so that the power saw can be moved in fine increments in a horizontal direction, and maintained in a precise spatial position. The power saw is mounted to the suspension beam via a rotatable shaft, and the shaft is driven by a gear-reduction motor to move the power saw to various desired angles. The axis of angular movement of the saw blade need not be disposed in the plane of the saw blade, but rather can be conveniently offset from the saw blade so that when the power saw is moved in an angular direction, the saw blade is swept through an arc. By utilizing the linear bearings and the beam for mounting the power saws, the cost of the unit is reduced, as is the maintenance thereof compared to the prior art sawing system. The gear-reduction positioning of the power saw assures precision and stable positioning thereof.

A related feature of the invention resides in the positioning of the two horizontally movable power saws, based on the angular position of the associated non-horizontally movable power saw to thereby carry out precision cuts in the board at precise locations. Because the power saws are no longer rotated about an axis that passes through the plane of the saw blade, whenever the angle of the blade is changed, the horizontal position is also changed to make a cut through a desired point on the board. Hence, based on the particular angular orientation to which the saw blade is positioned, the computer of the sawing system processes a mathematical equation to determine whether, and how much, the power saw must be horizontally moved to achieve the angle cut through a predefined point on the board. Moreover, when a board end is to be cut with two angles, the processing of the mathematical equation takes into consideration the angular position of one power saw to determine the horizontal displacement of the other power saw to achieve both of the desired angle cuts through the predefined point on the board.

In accordance with another feature of the invention, the in-feed chain conveyors are not constructed with a knee between an upward-angled portion and a horizontal portion, but rather are straight along the length thereof, and angled upwardly from a lower in-feed entry end to an upper rear portion thereof which is disposed between the left and right power cutting blades. With this arrangement, the operator can easily load lumber thereon at the in-feed end, a short height above the floor, whereby the conveyor carries the boards upwardly and into the power saws of the cutting system.

In accordance with yet another feature of the preferred embodiment of the invention, the material conveyor is constructed with two chain-feed material conveyors which have cantilevered drive bearings at the back ends thereof, and take-up mechanisms that are generally internal to the body of the conveyor, thus reducing the width of each conveyor. In this manner, the chain conveyors can be moved very close to each other, thereby allowing very short lengths of boards to be carried and cut by the power saws.

BRIEF DESCRIPTION OF THE DRAWINGS

Further features and advantages will become more apparent from the following and more particular description of the preferred and other embodiments of the invention, as illustrated in the accompanying drawings in which like reference characters generally refer to the same parts or elements throughout the views, and in which:

FIGS. 3a and 3b are views of a power saw secured to a base, and the base secured to a shaft such that the pivot axis of the saw is offset from the saw's blade and in orthogonal relation with the power saw's shaft for movably mounting a power saw to the sawing system;

FIG. 4 illustrates the various angles at which the power saw can be oriented according to the saw's pivot axis shown in FIG. 3;

FIGS. 5 and 6 are respective side and end views of the suspension beam of FIG. 3;

FIGS. 8a and 8b are flow charts showing the basic steps carried out by the sawing system computer to position the four power saws according to the calculation of the correction factors and angular position data;

DETAILED DESCRIPTION OF THE INVENTION

Figure 1:
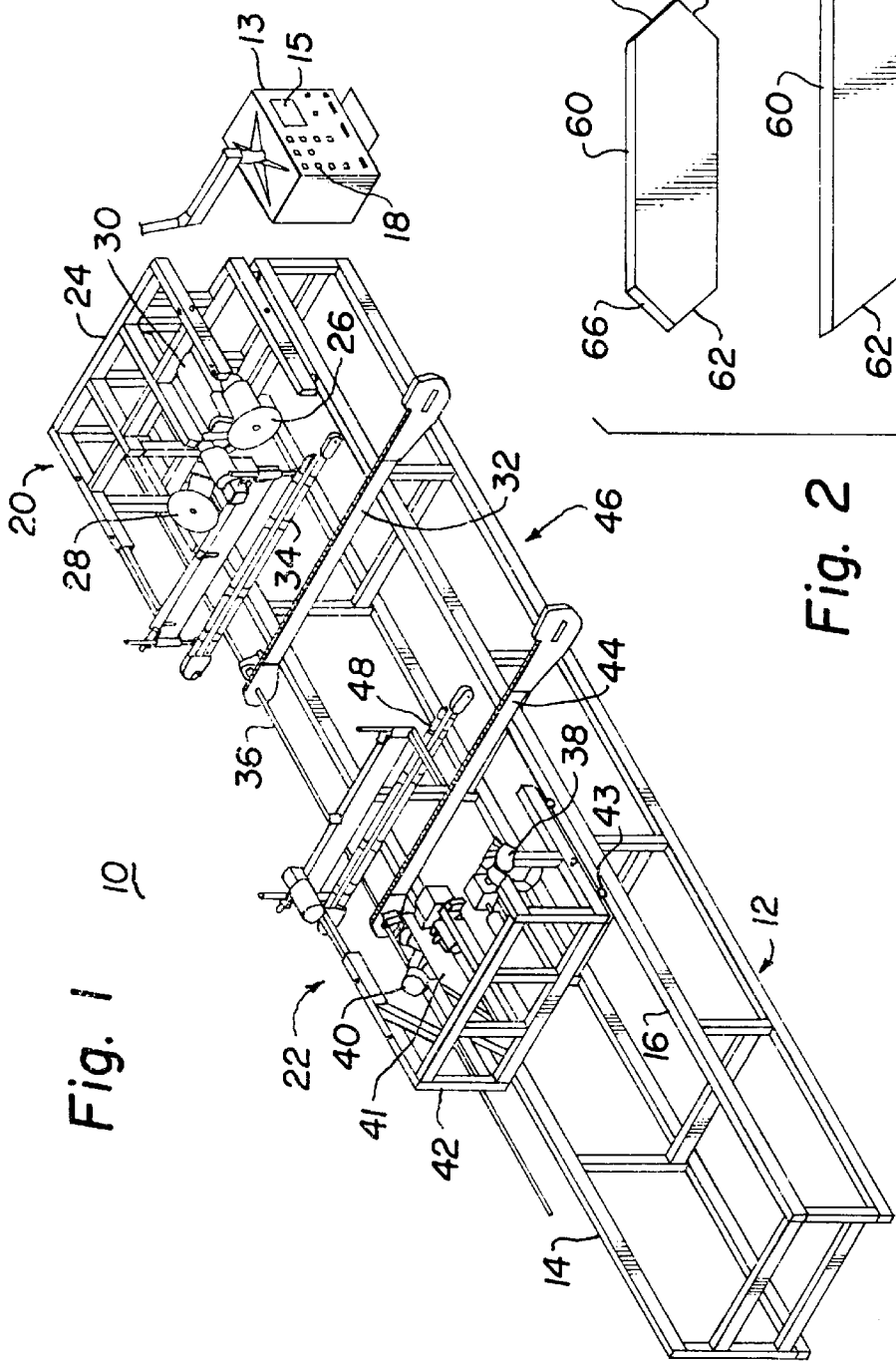
FIG. 1 is a generalized view of the cutting system employing the various features of the invention.

A sawing system 10 employing the features and advantages of the present invention is shown in generalized form in FIG. 1. The sawing system 10 of FIG. 1 can be located in an assembly operation where lumber or boards are input on a separate conveyor system (not shown) and carried to the sawing system 10. The operator can then manually move the lumber from the conveyor to the sawing system 10 for cutting to the appropriate lengths and angles. Then, the cut lumber is manually removed, or carried on another conveyor (not shown) to an assembly table where the cut lumber is laid together and fastened by nails or other hardware.

The sawing system 10 includes a frame structure 12 to which the other components are fixed so as to maintain the system in a unitary manner so that it can be transported or otherwise shipped or operated as a unit. The frame structure includes an upper back frame member 14, and a lower front frame member 16. The sawing system is computerized, and thus includes a cabinet 13 to house the computer and the associated electrical circuits and control equipment. The cabinet 13 may include a CRT 15, and various manual controls 18, such as knobs or push buttons for allowing the operator to communicate with the computer, in response to prompts and information displayed on the CRT 15. Those skilled in the art can readily devise the electrical hardware and software for controlling the sawing system 10 in the manner described below.

In accordance with the preferred form of the invention, the system frame structure 12 supports a fixed power saw carriage assembly 20 and a movable power saw carriage assembly 22. The fixed power saw carriage assembly 20 includes a framework 24 that supports two power saws 26 and 28 mounted at the right of the system frame structure 12. The right hand set of saws can be independently angularly positioned with a high degree of precision and stability for cutting lumber at various angles. The framework 24 is welded or otherwise fastened to the system frame structure 12. Further, the right front power saw 26 is movable about twenty-one inches horizontally on a respective suspension beam, which is shown as reference numeral 30. The other associated right back power saw 28 is not longitudinally movable, but is fixed with respect to such movement. The angular movements of both power saws 26 and 28, as well as the longitudinal movement of power saw 26 via the suspension beam 30, can be controlled automatically by a computer control mounted in cabinet 13 and controls 18. Conventional DC drive controls are utilized by the computer to drive the motors that provide angular displacements of all four power saws, as well as to provide horizontal displacements of power saws 26 and 40. With such type of drive controls, the amplitude of the DC voltage determines the speed of the motor, while the duration of the voltage controls the time by which the motor is active.

The fixed power saw carriage assembly 20 also includes a material conveyor 32 angled downwardly to a frontal portion thereof to facilitate loading of boards or lumber thereon. A hold-down mechanism 34 disposed above the material conveyor 32 functions to hold lumber down on the material conveyor 32 to prevent tumbling or unwanted movement of the lumber. As will be described in more detail below, the material conveyor 32 is driven by a square shaft 36 which is itself driven at one end thereof (not shown).

The movable power saw carriage assembly 22 includes essentially the same components as the fixed power saw carriage assembly 20, but is longitudinally movable up and down the system frame 12. To that end, the movable power saw carriage assembly 22 includes first and second associated power saws 38 and 40, where power saw 40 is suspended from respective movable suspension beam 41. While the left back power saw 40 can be moved both horizontally and angularly with respect to the moveable power saw carriage 22 the left front saw 38 can only be moved by angular rotational movements with respect to the movable power saw carriage 22. Both power saws 38 and 40 are controlled so as to be positioned at desired angles for cutting boards at corresponding angles. The power saw suspension assembly of power saw 40 is connected to a movable carriage framework 42 which, in turn, rests on the system frame 12 via rollers 43. Conventional roller assemblies are utilized for providing movable attachment above and on each side of a rail which is attached to the horizontal frame members 14 and 16. The movable framework 42 and rollers 43 allow the carriage assembly 22 to be moved longitudinally on the frame 12. Further, the carriage framework 42 is driven by a rack and spur gear arrangement (not shown) so that the power saws 38 and 40 can be positioned very accurately along the system frame 12 with respect to the power saws 26 and 28, thereby enabling the cutting of angles at each end of a board, and leaving the board with a precise overall length. The movable power saw carriage assembly 22 further includes a material conveyor 44 which, together with the associated material conveyor 32, forms an in-feed or entry point of in-feed system 46. A hold-down mechanism 48 is disposed above the material conveyor 44, and is operable to move downwardly to clamp a workpiece to the material conveyor 44, and thus move the workpiece into the sawing system. An electrical umbilical chord (not shown) having a cable carrying all the electrical power and control signals is connected to the movable power saw carriage assembly 22 and travels with the assembly as it is caused to move up and down the system frame 12, under control of the computerized control in cabinet 13. It should be noted that the power saws 38 and 40 are independently powered by respective motors, as are the power saws 26 and 28 associated with the fixed carriage 20. However, the material conveyors 32 and 44 are each powered from the common square drive shaft 36. The pair of hold-down mechanisms 34 and 48 are driven by the same source as the square drive shaft 36 to move respective hold-down chains.

It can be appreciated that for long pieces of lumber, the movable power saw carriage assembly 22 is moved to the left in FIG. 1, carrying with it the movable material conveyor 44 and associated hold-down mechanism 48. In order to cut very short pieces of lumber, the movable power saw carriage assembly 22 is moved to the right, very close to the fixed power saw carriage assembly 20. The material conveyor 32 and the hold-down mechanism 34 associated with the fixed power saw carriage assembly 20 are movable longitudinally a short distance by a rack and spur gear arrangement (not shown), in coordination with the longitudinal movement of the suspension beam 30. Thus power saws 26 and 28 can not be moved into the associated material conveyor and cut into the metal thereof. The left-hand material conveyor 44 and the associated hold-down mechanism 48 function in the same manner with respect to the movement of power saws 38 and 40.

Figure 2:
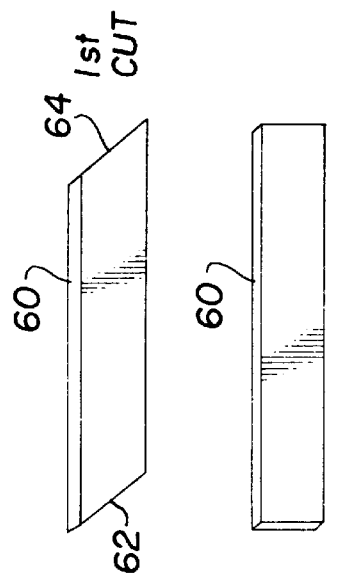
FIG. 2 are views of a wooden web for a truss, as the wood stock progresses through the sawing system of the invention.

FIG. 2 illustrates the various stages of a board as it is processed through the cutting system 10. An uncut piece of lumber, such as shown by reference numeral 60, is loaded on the material conveyors 32 and 44 of the in-feed system 46. This is easily accomplished, as the frontal portion of the in-feed system 46 is at an optimal distance above the floor, e.g., about thirty-two inches, thereby eliminating the need for the operator to lift boards to uncomfortable heights. As noted in FIG. 2, the uncut board 60 constitutes raw material with either square or rough ends. Next, the chain (not shown) of each of the material conveyors 32 and 44 have steel dogs that pull the board 60 forward until it is secured under each hold-down mechanism 34 and 48. Each hold-down mechanism has a driven chain which engages the top of the board. The chains of the hold-down mechanism 34 and the associated material conveyor 32 move at the same speed, and thus uniformly move the board into the sawing system.

Assuming the right-side power saws 26 and 28 and the left-side power saws 38 and 40 are to be set up to cut two angles at each end of the board so as to achieve the board shown in the top illustration of FIG. 2, the following steps are carried out. First, the sawing set up would be programmed into the computer to move the movable power saw carriage assembly 22 toward the fixed power saw carriage assembly 20 so that the power saws 26 and 40 can then be angled and moved on their respective suspension beams to achieve the correct angles and the correct length of the board. It is noted that, although not a necessity, the front right saw 26 cuts the top angle cut 64 while the back right saw 28 cuts a bottom angle cut 68 in the board 60, and the front left saw 38 cuts the bottom angle cut 62 while the back left saw 40 cuts the top angle cut 66 in the board 60. While the system 10 has been described such that the front power saws 26 and 38 perform the respective upper and lower angle cuts 64 and 62, and the back saws 28 and 40 perform the respective lower and upper cuts 68 and 66 on the ends of the board, the operations can be reversed or otherwise changed by the appropriate orientations of the power saws in the respective frames. Assuming the angles at both ends of the board are to be forty-five degrees, for example, the front power saws 26 and 38 would be angled so that as the board 60 is moved through such saws, the angle cuts 64 and 62 are cut as the board is moved past the blades of frontal power saws 26 and 38 in the first cutting operation. The back power saws 28 and 40 are angled in the opposite directions so as to achieve the forty-five degree cuts 68 and 66, respectively in the second cutting operation. The entire cutting operation takes only a few seconds or so to complete. The fully cut board is thus carried by the in-feed system 46 through the saws and delivered to an out-feed structure to be carried to an assembly area.

The cut or scrap ends of the board drop onto a disposal system, such as a shaker type system (not shown) that is located in the lower portion of the frame, under the left and right sets of power saws. The disposal system extends the full length of the sawing system 10. The disposal system moves the scrap from the cutting area to a scrap disposal area. Because the disposal system is located under the power saws, more space is required. In order to circumvent a space problem, the material conveyors 32 and 44 are angled upwardly to provide sufficient space below the power saws.

FIGS. 3a and 3b illustrate the suspension beam and offset pivot axis mounting that allows horizontal positioning of the power saws 26 and 40, as well as provide angular movements for cutting various angles in the lumber processed by the sawing system 10. The power saw 26 is mounted for precise angular movements with respect to the suspension beam 30. Suspension beam 30 can be linearly moved back and forth with respect to the board to be cut. The power saw 26 includes an electric motor 80 and an 18-inch saw blade 82, or other appropriately sized saw blade. The saw blade 82 rotates about the axis of the rotating shaft of the motor 80. The electric motor 80 is fixed to a metal base plate 84 that is welded, bolted or otherwise attached to a bearing shaft 86 at one corner of the plate 84. The power saw 26 is angularly moved about the rotational axis of the bearing shaft 86. The pivotal or angular movements of the power saw 26 are shown in FIG. 4 in various positions.

While in the preferred embodiment of the invention, the rotatable bearing shaft 86 is mounted near a corner of the mounting plate 84, the pivotal axis of the plate 84 can be at any other location thereon to achieve different paths of pivotal motion of the saw blade. Indeed, the saws that make the bottom cuts 62 and 68 on the board shown in FIG. 2 are mounted for pivotal movement near a top corner of the base plate 84 as shown in FIG. 7d, while the saws that make the top angle cuts 64 and 66 are mounted for pivotal movement near the bottom left corner of the base plate 84, as viewed in FIG. 7c. Those skilled in the art may prefer to mount the rotatable shaft 86 in the middle of the base plate 84, or at corners of the base plate 84 other than described above.

With reference to FIGS. 3–6, the shaft 86 passes through a hole in the suspension beam 30, but is fixed thereto by a pair of bearings 88 and 90. The bearings 88 and 90 are fastened to the suspension beam 30 by bolts or other suitable hardware. The shaft 86 constitutes an output of a first worm gear reduction unit 92. As noted in FIG. 5, the gear reduction unit 92 has an input shaft 94 connected via a coupling 96 to a second helical gear reduction unit 98 and a reversible drive motor 100. The motor 100 and gear reduction unit 98 are typically available as a gear motor unit. DC power is supplied to the drive motor 100 by way of the electrical wires 102 to drive the motor in a clockwise or counterclockwise manner. Further, a conventional shaft encoder 104 is connected to the rear shaft end of the motor 100 to provide output signals indicating the angular displacement of the motor 100. The shaft encoder output is shown as the conductors identified by reference numeral 106. By ascertaining the angular displacement of the motor 100 and knowing the ratio of reductions of the gear reduction unit 98 and gear reduction unit 92, the angular displacement of the saw blade 82 can be accurately determined and maintained. By utilizing an overall gear reduction in excess of 1000:1, very accurate and stable angular positioning of the power saws can be achieved.

With reference again to FIGS. 3, 5 and 6, the suspension beam 30 is suspended by way of a pair of linear bearings 110 and 112. The linear bearings are of a conventional type. This type of bearing includes corresponding v-groove and v-tongue rail with mating surfaces, as better shown in FIG. 6. The v-groove rail is fixed to the top of the suspension beam 30 by screws (not shown) that are threaded into the top edge of the suspension beam 30. The pair of v-tongue members of the bearings 110 and 112 are connected together by a support 114 between a pair of threaded stubs 116 and 118 that are fastened to the support 114, as well as fastened to lateral bracket members 120 and 122. The bracket members 120 and 122 are rigidly fastened to the carriage framework 24 or 42 of the power saw carriage assemblies 20 or 22, respectively. The linear bearings allow the suspension beam 30 to be accurately suspended without any vertical or lateral play. Further, two pairs of cam followers, one of which is shown as reference numeral 124, straddle the bottom edge of the suspension beam 30 to limit the sideways movement of the rail, but allow longitudinal movement of the beam 30. Each cam follower 124 is fastened to a bracket which, in turn, is fastened to the power saw carriage frame. Those skilled in the art may prefer to locate the linear bearings at the bottom of the suspension beam 30, and the cam followers at the top.

As can be best seen in FIGS. 5 and 6, the DC drive motor 100 and the two gear reduction units 92 and 98 are mounted on one side of the suspension beam 30, while the saw motor 80 and base plate 84 are mounted to the opposite side. This arrangement provides a certain degree of balance to the suspension beam 30, in that the weight is distributed across the suspension beam 30. This balance reduces wear on the cam followers 124 as well as uneven wear on the linear bearings 110 and 112.

A DC drive motor 126 shown in FIG. 3b provides longitudinal drive to the suspension beam 30, via a rack gear 128 and a mating spur gear 130. The end of the rack gear 128 is bolted to the suspension beam 30. The motor 126 is suitably fastened to the power saw carriage frame in a manner not shown. Further, the drive motor 126 also includes a shaft encoder to provide feedback pulses to the computer system, thereby providing position information as to the longitudinal position of the saw blade 82 of the power saw 26. While not shown, the motor 126 may be provided with internal or external gear reduction assemblies to reduce the speed of the spur gear 130, and thus provide more accurate longitudinal movements of the suspension beam 30. Alternative drive mechanisms, such as screw drives and the like can be utilized for moving the suspension beam 30 by way of the linear bearings 110 and 112.

The two power saws 26 and 40 of the sawing system of FIG. 1 are mounted for both longitudinal and angular movements in the same basic manner as shown in FIG. 3. The power saws 28 and 38 are not mounted by way of the suspension beam and linear bearing mechanisms, but rather are mounted to a fixed frame structure using the bearings 88 and 90 and gear reduction units 92 and 98 to provide only angular displacements of the respective saw blades. Those skilled in the art may find it advantageous to equip a sawing system with fewer or more than the four power saws described above, using either angular rotational movement and/or longitudinal suspension beam movement apparatus.

As noted in FIG. 4, the pivot axis of each power saw mounted according to the invention, is coaxial with the axis of the bearing shaft 86, and does not extend through the planar face of the saw blade 82. Because the pivotal axis of the power saw is offset from the blade 82, the sawing path of the blade 82 is not blocked, nor are complicated or maintenance intensive components required. However, because the pivotal axis of the power saw is offset from the plane of the saw blade 82, at least one power saw associated with the fixed power saw assembly 20 and one power saw of the movable power saw assembly 22 requires the capability of horizontal movement. As noted above, the right front power saw 26, as well as the left back power saw 40 are mounted to respective suspension beams 30 and 41, thereby allowing for precise horizontal movements.

Figure 7A:
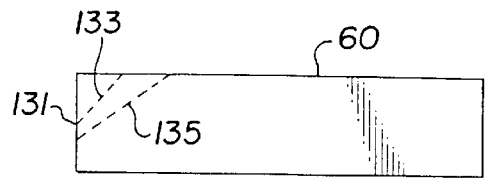
FIGS. 7a 7b, 7c, and 7d, illustrate the relationship between the angles to be cut in a truss board, and the calculation of a correction factor by which a horizontal movable power saw of the sawing system must be displaced to make an angle cut through a predefined point on the board.

FIG. 7a illustrates the reason why one of the power saws in each of the left and right assemblies requires the capability of horizontal movement in order to cut an angle through a board at a precise location. As noted above, the power saw 40 is located at the left back of the sawing system, and is adapted for cutting the top angle in the board 60. Assume, for example, that a 135° angle 133 is to be cut in the board 60, through the predefined point 131. The back left saw 40 is controlled by the computer to rotate the power saw to the correct angular orientation, as well as horizontally move the power saw via the suspension beam 41 to make the 135° cut through the predefined point 131. Then, assume next that a 150° angle 135 is to be cut in the top of a subsequent board. If the power saw 40 were simply rotated to the 150° location, then a cut 135 shown in FIG. 7a is made. However, the cut 135 does not pass through the predefined point 131, due primarily to the offset rotational axis of the power saw 40 with respect to the blade. A correction can be made by moving the power saw 40 to the left so that the cut will proceed directly through the predefined point 131. A cut "through" a predefined point is also construed herein to mean that the cut is made just adjacent to the point.

The computation to achieve the correction factor for horizontally locating the saw 40 is complicated by the fact that the associated left front power saw 38 is also pivotal about an offset axis, although not movable in a horizontal direction. The technique according to the invention for deriving the correction factor and cutting a board with precise angles through a predefined point of the board is set forth below.

Figure 7B:
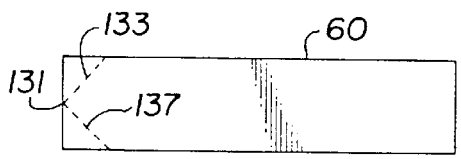

With reference to FIG. 7b; assume that the board 60 is to be cut with a top 135° angle 133 through point 131, and a bottom 60° angle 137, again through the predefined point 131. In the example, the predefined point 131 is exactly midway between the top of the board 60 and the bottom of the board shown in FIG. 7b. In order to determine the correction factor, various dimensions between the pivotal axis of the power saws and the board must be known, it being realized that the board is constrained and fixed with respect to the power saws 38 and 40. The material conveyor 44 in conjunction with the hold down mechanism 48 provide the function of fixing the board laterally with respect to such power saws.

Figure 7C:
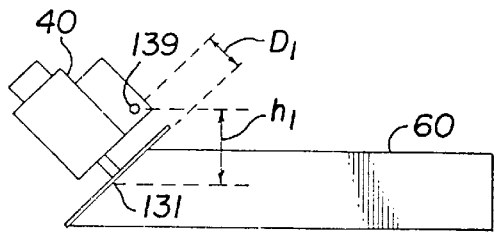
Figure 7D:
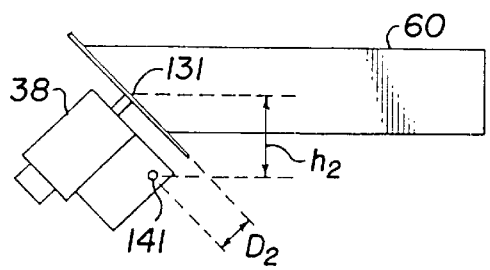

With regard to FIG. 7c, the power saw 40 is shown with respect to the board 60. The vertical distance $h_1$ between the top saw pivot point 139 and the predefined point 131 on the board 60 must be known. Another relevant dimension of the power saw 40 is $D_1$ which is the perpendicular distance between the power saw pivot axis 139 and the front face of the power saw blade. Further, and with reference to FIG. 7d, the vertical distance $h_2$ between the pivot axis 141 of the bottom power saw 38 and the predefined point 131 on the board 60 must also be known. Similarly, the perpendicular distance $D_2$ must be determined between the power saw pivot axis 141 and the front face of the blade of the power saw 38. Based upon the height of the board 60 and the particular angles to be cut in the board 60, the predefined point can be easily determined as a function of the distances $h_1$ and $h_2$ between the respective pivot axis 139 and 141 of the power saws 40 and 38 respectively. Lastly, the required angular orientations of both the power saws 40 and 38 must be known, but the angle data can be easily obtained from the drawings or information relating to the truss chords or webs to be cut. It should be noted that the power saw 40 is programmed to traverse an angular displacement of between 53°–166°, with zero degrees being defined when the blade is horizontal and 90° when the blade is vertical. On the other hand, the left front power saw 38 is programmed to rotate through an angular range of 14°–128°. It has been found that these angular displacements are suitable for cutting the various angles normally encountered in wooden trusses.

The power saws 40 and 38 are mounted for angular movements about the respective pivot axis 139 and 141 as shown in FIGS. 7c and 7d. It is to be understood that the right front power saw 26 is mounted for pivotal movement about the shaft 86 as shown in FIG. 3. The right back power saw 28 has a pivot axis below the motor of the power saw and to the lower left corner of the base plate, rather than the upper left corner as shown in FIG. 3 with respect to power saw 26.

It is further noted that the range of horizontal displacements of the power saw 40, due to movement of the suspension beam 30, is about 21 inches. A horizontal reference point from which a correction factor is determined from where the suspension beam 30 can be moved three inches to the right when facing the sawing system 10, and from where it can be moved 18 inches to the left. The horizontal reference points are entirely arbitrary and could be established at other positions. In other words, the reference point for determining horizontal displacements or correction factors, is at a point about one-seventh of the total horizontal displacement, as measured from the right-most end position of horizontal travel. Thus, when positioning the horizontally movable power saws 26 and 40, such saws are initially positioned at a respective reference point on their carriage assemblies 20 and 22, and then displaced therefrom based upon the calculation of correction factors, according to the following formula:

$$\text{Correction Factor} = \left[\frac{-2\sqrt{D_2^2 + h_2^2}\,\text{Sin}\left(\frac{\theta_2 - 90°}{2}\right)\text{Sin}\left(45° + \frac{\theta_2}{2} - \text{Tan}^{-1}\frac{D_2}{h_2}\right)}{\text{Sin}(180° - \theta_2)}\right] - \left[\frac{2\sqrt{D_1^2 + h_1^2}\,\text{Sin}\left(\frac{\theta_1 - 90°}{2}\right)\text{Sin}\left(135° - \frac{\theta_1}{2} - \text{Tan}^{-1}\frac{D_1}{h_1}\right)}{\text{Sin}\theta_1}\right]$$

As noted above, $h_1$ is the vertical distance between the pivot axis 139 of power saw 40 and the predefined point 131 on the board, while $h_2$ is the distance from the pivot axis 141 of power saw 38 to the predefined point 131 of the board. In the equation noted above, $\theta_1$ is the angle of the blade of power saw 40, while $\theta_2$ is the angle of the blade of power saw 38, where a zero degree reference is when the saw blade is horizontal. The correction factor resulting from the calculation of this equation is the distance from the reference point of power saw 40 by which such power saw must be horizontally moved in order to cut the angle $\theta_1$ through the predefined point 131 on the board 60. Positive correction factors refer to displacements toward the left end of the machine, while negative correction factors refer to displacements toward the right of the machine, when viewed from the front of the sawing system 10 of FIG. 1. The portion of the equation in the first set of brackets, before the subtraction sign, represents a dimension contributed by the power saw 38, while the portion of the equation in the last set of brackets represents a dimension contributed by the power saw 40. For sawing systems utilizing only a single horizontally and angularly movable power saw, such as saw 40, then the only portion of the equation needed is the last bracketed portion. By utilizing the correction factor of only a single power saw, it can be horizontally moved so that any angle can be cut through the same predefined point on the board. A similar equation noted above can be utilized for determining the correction factor for horizontal displacements of the power saw 26 located on the suspension beam 30 of the fixed power saw carriage assembly 20 of the right hand side of the sawing system 10.

Figure 8A:
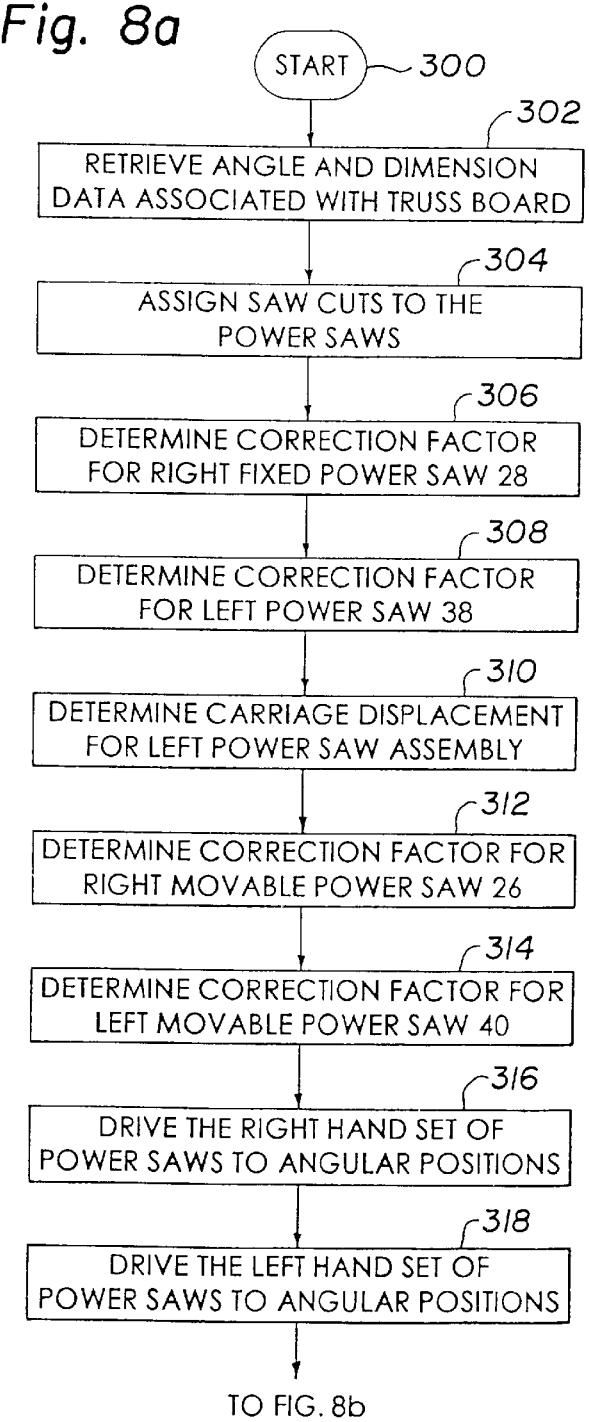

FIGS. 8*a* and 8*b* are flow charts depicting the general steps carried out to set up the angular positions of all four power saws, as well as the horizontal position of the horizontally movable power saws. Based upon the drawings of all the dimensions and angles of a truss to be cut with the sawing system, a predefined point associated with one or two angles and at each end of the board can be determined. Further, the linear distance between the predefined points can also be determined, which distance is related to the carriage movement of the movable power saw assembly 22, again with respect to an arbitrary reference position. In other words, the parameters $\theta_1$, $\theta_2$, $h_1$, $h_2$, $D_1$, $D_2$, the predefined points at each end of the board, and the distance between the predefined points is all known either from the truss drawings, tables or other calculations. Such data is entered in a predefined format in the computer so that the computer can decode such information and utilize it in conjunction with the equation. When such data is loaded into the computer and the particular types of trusses associated with a program is selected to be run, the computer proceeds through the generalized steps set forth in FIG. 8. Those skilled in the programming art will readily recognize that the steps of the flow chart can be carried out into many different program languages, utilizing the appropriate instructions to accomplish the result noted.

According to program flow block 300, the computer starts processing the truss and saw cut information to derive the correction factors and the other data necessary to position the power saws 26 and 28 on the fixed power saw carriage assembly 20, the movable power saw carriage assembly 22, the power saws 38 and 40 on the carriage assembly 22, the conveyors 32 and 44, and the hold-downs 34 and 48 of the sawing system 10. In program flow block 302, the angle data and dimension data are retrieved from the database associated with the particular truss board to be cut. Program flow block 304 includes those instructions for determining which saws can accomplish the desired cuts most efficiently. For example, the front left saw 38 can make cuts at the bottom of a board at angles between 14°–90°, whereas the front right saw 26 can make cuts at the top of a board at angles between 14 °–90°. If a board requires the type of cuts within the ranges noted by the front saws, then the back saws 28 and 40 do not even have to be activated. In carrying out the instructions of program block 304, the computer essentially assesses the type of cuts at each end of the board, and then assigns a particular cut to each power saw, recognizing that one or more of the four power saws may not be required. In program flow block 306, the parameters that include the angle data and dimension data are substituted in the equation to the right of the subtraction sign noted above, and the correction factor for the right hand fixed power saw 28 is calculated. The right hand power saw carriage assembly 20 is fixed with respect to any horizontal carriage movement. In program flow block 308, angle and dimension data corresponding to the left edge of the truss board is substituted into the equation and the correction factor for the left fixed power saw 38 is determined. Then, in program flow block 310, the distance between the predefined point at each end of the truss board is calculated so that it is known where the movable power saw carriage assembly 22 should be positioned. In program flow block 312, the computer calculates the correction factor for the right, front movable power saw 26. The next set of instructions carried out by the computer of the sawing system 10 is shown in program flow block 314. Here, the correction factor for the left, back movable power saw 40 is calculated. the bracketed portion of the foregoing equation to the right of the subtraction sign is processed to determine the horizontal displacement, or correction factor, from the reference position.

In program flow block 316, the computer drives the right hand power saws 26 and 28 to the calculated angular positions. As noted in program flow block 318, the power saws 38 and 40 associated with the left assembly 22 are driven to the desired angular positions. The suspension beam 30 to which the right, movable power saw 26 is rotatably attached, is driven horizontally from its reference position according to the calculated correction factor determined in program flow block 312. This is shown in program flow block 320. Then, as noted in program flow block 322, the suspension beam 41 to which the left power saw 40 is rotatably mounted, is displaced horizontally from the reference position according to the correction factor calculated in program flow block 314. Lastly, the movable power saw carriage assembly 22 is moved according to program flow block 324 either right or left so that the correct spacing will exist between the predefined points on each end of the board after the sawing operation is complete. In other words, the cut board is then of the correct length between the predefined points. The computer then exits the subroutine of FIG. 8*b* as noted in program flow block 326. It is to be noted that all movements of the saws are processor controlled and occur at substantially the same time.

From the foregoing, it can be seen that the horizontal displacement associated with the correction factor is a function of the angular orientations of both of the associated saws. In practice, it has been found that with the sawing system 10 disclosed above, angles can be cut in truss boards with a precision of ±0.05, and various dimensional characteristics of the truss board can be cut with an accuracy of ±1/32 inch (about 0.79 millimeters).

Figures 9, 10:
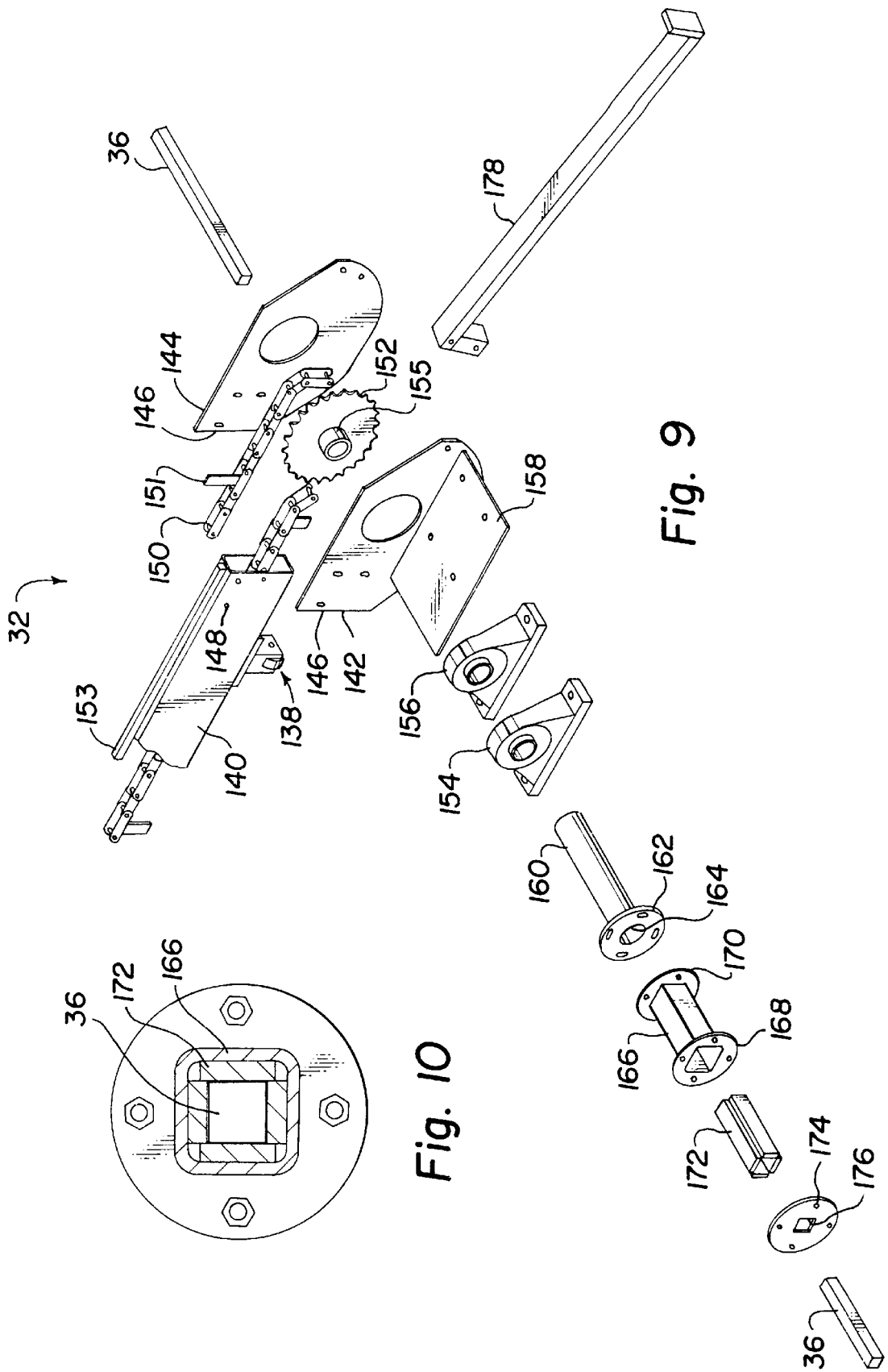
FIG. 9 is an exploded view of the drive mechanism of an upper portion of the material conveyor of the invention.
FIG. 10 is a cross-sectional view of a material conveyor drive assembly with replaceable plastic inserts between the driven metal parts.
Figure 13:
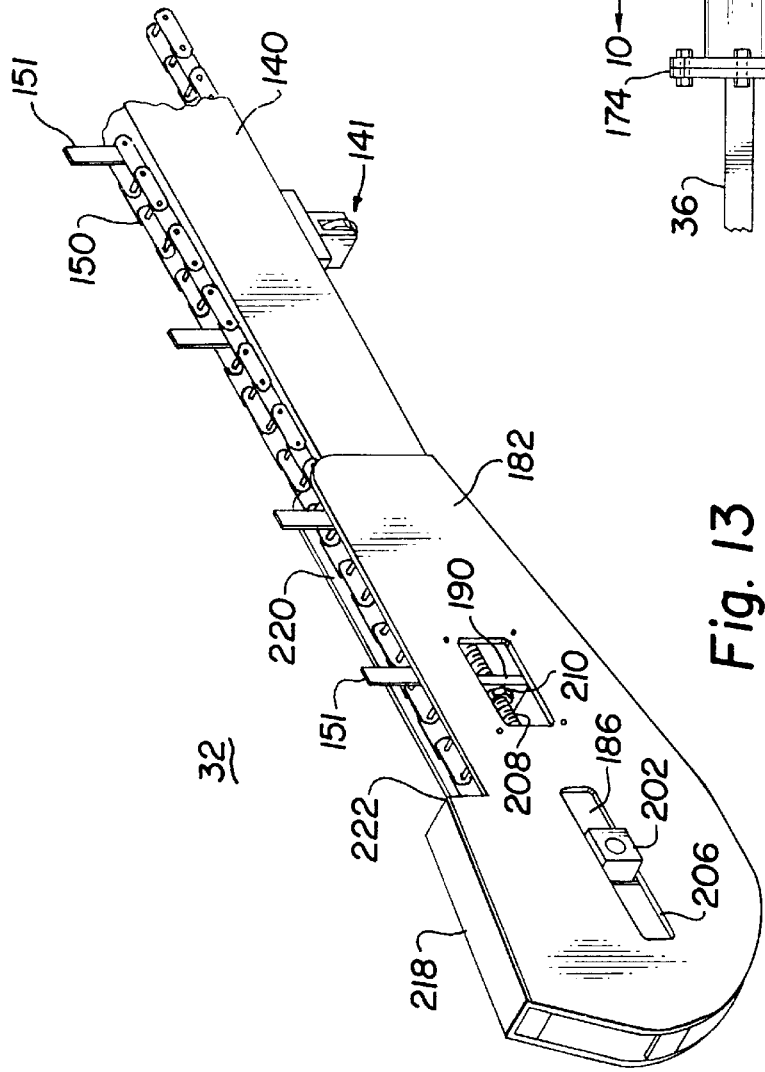
FIG. 13 is an isometric view of the assembled portion of the material conveyor of FIG. 12.

FIGS. 9–13 illustrate the details of one material conveyor 32 of the in-feed conveyor system 46. Particularly, FIG. 9 illustrates an upper portion of the material conveyor 32 of FIG. 1, while FIG. 13 shows a lower portion of the material conveyor 32, again of FIG. 1. As noted above, the upper portion of the material conveyors 32 and 44 rest on the horizontal frame member 14 while the lower portion of the material conveyors 32 and 44 rest on the lower horizontal frame member 16. Also as noted above, the material conveyors 32 and 44 can be accurately moved laterally by a spur and rack gear arrangement (not shown). Irrespective of their lateral positions on the frame 12, the material conveyors 32 and 44 remain driven by the square drive shaft 36. The material conveyor 32 described in connection with FIGS. 9 and 10 is substantially identical to the other material conveyor 44.

Figure 12:
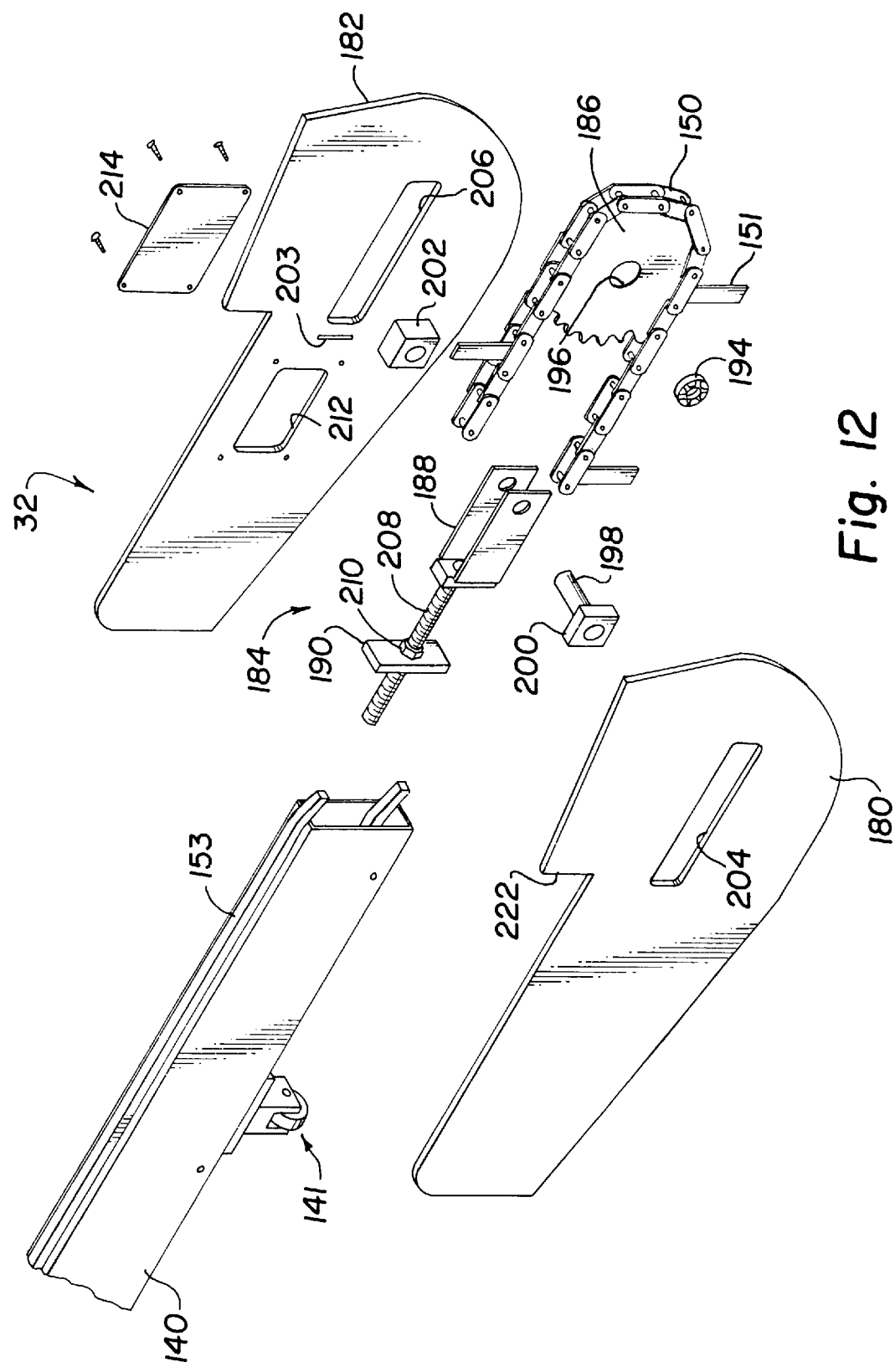
FIG. 12 is an exploded view of the chain take-up mechanism of a bottom portion of the material conveyor of the invention.

The material conveyor 32 includes an elongate tubular metal span support 140 that substantially spans the distance between the top back frame member 14 and the top front frame member 16 of the sawing system frame 12 shown in FIG. 1. An upper set of cam rollers 138 and a lower set of cam rollers 141 are mounted for rotation to the bottom of the span support 140. FIGS. 9 and 12 illustrate the upper set of cam rollers 138 fixed to the underside of the span support 140, and the lower set of cam rollers 141 fixed to the span support. Each set of rollers 138 and 141 are spaced apart so as to straddle a square key stock member (not shown) along the top surface of each horizontal frame member 14 and 16 of FIG. 1. With this construction, the material conveyors 32 and 44 are supported for horizontal movement along the frame members 14 and 16.

A pair of upper protective enclosure plates 142 and 144 are bolted on each side of the span support 140 via the holes, such as shown by reference numerals 146 and 148. A metal chain 150 of the conventional link-type, with dog-ear extensions 151 welded to a link every 16 inches, or so, is routed over the top surface of the span support 140 and in between the protective enclosure plates 142 and 144. To facilitate travel of the chain 150 on the span support 140, a narrow square key stock 153 is welded to the top surface thereof. The key stock 153 provides a guide on which the chain 150 can move, as well as reduce wear on the span support 140 itself. A sprocket wheel 152 is disposed between the protective enclosure plates 142 and 144, and provides a drive for driving the chain 150. It is noted that the chain 150 and dogs 151 engage the lumber or wood and carry the material into the sawing system 10. The return path of the chain 150 is inside the hollow span support 140.

Figure 11:
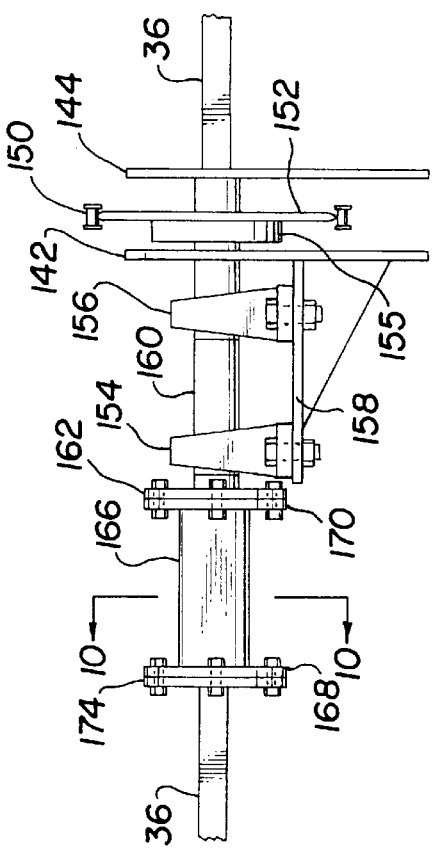
FIG. 11 is a back view of the top portion of the material conveyor of FIG. 9.

A pair of spaced-apart cantilever bearings 154 and 156 are mounted by bolts (FIG. 11) to a support plate 158. The support plate 158 is welded to the protective enclosure plate 142. Both bearings 154 and 156 are mounted in a cantilever manner outside and to the left (when viewed from the back of the sawing system) of the protective enclosure plate 142, as shown in FIGS. 9 and 11. A flanged tubular stub 160 passes through both bearings 154 and 156, and into a QD type bushing 155. Once the tubular stub 160 is situated through the bearings 154 and 156 and snugly inserted into the QD bushing 155, the bushing 155 is tightened to secure the sprocket wheel 152 to the tubular stub 160. Then, the sprocket wheel 152 is laterally adjusted for alignment of the chain 150 with the span support 140. Lastly, the center part of the cantilever bearings 154 and 156 are secured to the tubular stub 160 by set screws (not shown) or other suitable means. With this arrangement, the bearings 154 and 156 support the sprocket wheel 152 in a cantilever manner for rotation and for driving the chain 150. As noted, a flange 162 having a central hole 164 therein is welded or otherwise secured to the end of the tubular stub 160. A square tubular drive member 166 about six inches long is provided, with flanges 168 and 170 fixed at each end thereof. The flange 170 is then bolted to the flange 162 of the tubular stub 160.

Four plastic inserts 172 are provided as a durable cushion between the square drive shaft 36 and the square tubular drive member 166. An end cap 174 having a square hole 176 therein is fabricated for fastening with screws or other suitable means, to the flange 168 of the square tubular drive member 166. With this arrangement, the square drive shaft 36 is passed through the end cap 174, through the square tubular drive member 166, through the round tubular stub 160 and thus exits the protective enclosure plate 144, as shown in FIGS. 9 and 11. Once the square drive shaft 36 is routed through the square tubular drive member 166, the individual plastic cushions 172 can be manually inserted between the four sides of the square drive shaft 36 and the four corresponding internal surfaces of the tubular drive member 166. Once the plastic cushions 172 are installed, the end cap 174 can be secured to the flange 168 to capture the inserts 172 and maintain them in place. In the preferred embodiment, the drive shaft 36 is 1.25 inches square, and each plastic insert is about one inch wide and about six inches long, with a thickness of about 3/8 inch.

The plastic inserts 172 are fabricated of a UHMW type of plastic that is extremely durable for transferring the rotational drive torque of the square shaft 36 to the square tubular drive member 166. Other types of plastic or cushion material, such as Nylatron, may be equally effective as a durable interface between the metal parts. Each plastic insert is cut from sheet material of 3/8 inch thickness, to pieces about one inch by six inches. The plastic inserts 172 prevent direct metal-to-metal contact between the drive shaft 36 and the tubular drive member 166, thus eliminating wear between the metal parts. Rather, the wear incurred is on the plastic inserts 172, which can be easily replaced by removing the end cap 174, pulling out the old inserts, and inserting new inserts, all without having to remove the drive shaft 36 from the material conveyor 32. Moreover, with the arrangement shown in FIG. 9, the material conveyor can be moved up and down the square drive shaft 36 and yet remain driven at any axial location. It should also be noted that the top portion of the material conveyor 32 is not otherwise fixed to the frame system shown in FIG. 1, but rather rests on the lateral frame member 14 on a set of cam rollers 138 (FIG. 9), as noted above.

Lastly, the upper end of the material conveyor 32 includes an out-feed arm 178 bolted to the protective enclosure plates 142 and 148 for catching the cut boards after having been processed through the sawing system 10 of the invention. The arms 178 of each material conveyor 32 and 44 provide a catch mechanism so that the cut boards do not fall on the floor, but rather can be accumulated so that they can be manually unloaded and carried or otherwise conveyed to a truss assembly area. If a conveyor is provided so that the cut boards can be automatically transported to an assembly area, the out-feed arms 178 can be eliminated or removed.

FIG. 10 illustrates a cross-sectional view of the square drive shaft 36 as it passes through and drives the square tubular member 166, with the plastic inserts 172 disposed therebetween. It can be appreciated that as the square drive shaft 36 is rotationally driven, the side walls thereof exert a torque on the plastic inserts 172 which, in turn, drive the square tubular member 166. As noted above, any wear that is caused by way of this driven relationship is on the plastic inserts 172, which are easily replaceable and inexpensive. The down time of the system due to replacement of the inserts 172 is small, as only the end cap 174 need be loosened and moved away from the flange 168, the worn inserts withdrawn, and new inserts inserted. While the preferred embodiment of the invention utilizes four individual inserts 172, it can be appreciated that all four inserts can be connected at an elongated corner edge thereof by a living hinge, with two of the longitudinal edges of the inserts being disconnected, so that the unit can be wrapped around the drive shaft 36 and slid into the square tubular member 166. It can be appreciated that the down time for removal of the worn inserts and replacement thereof with new inserts is very short and is easily accomplished.

It should be understood that the other in-feed material conveyor 44 is constructed in a mirror image of the material conveyor 32 described above. In other words, the cantilever bearings and drive mechanism of the other material conveyor 44 are mounted on the right (as viewed from the back) of the material conveyor 44 so that the two material conveyors 32 and 44 can be moved very close together to accommodate short pieces of lumber.

With reference now to FIGS. 12 and 13, there is illustrated the in-feed assembly comprising the lower or bottom portion of the material conveyor 32. The bottom portion of the span support 140 is shown, in its relationship to a left side cover plate 180 and a right side cover plate 182 that are welded or otherwise secured to the opposing sides of the span support 140. The side cover plates 180 and 182 enclose a chain take-up mechanism 184 that includes a toothed chain gear sprocket 186 and a yoke 188 having a threaded adjustment rod. The sprocket 186 is secured to the yoke 188 by use of a bearing 194 that is press fit into the bore 196 of the sprocket 186. A pin 198, welded to a square head 200, passes through the sprocket bearing 194 which is disposed within the yoke 188. The end of the pin 198 is fastened to a square head 202 by using a split pin 203 that is press fit through a bore drilled through the head 202 and the end of the pin 198. The square heads 200 and 202 fit within the square slots 204, 206 of the respective side cover plates 180 and 182. It can be seen that the sprocket 186 is longitudinally constrained by movement of the pin 198, via the square members 200, 202 in the respective slots 204 and 206 of the cover plates 180 and 182. Further, the longitudinal movement or adjustment of the sprocket 186 is obtained by way of the threaded rod 208 which is welded to the yoke 188 at one end, and is threadably adjusted by a lock nut 210 with respect to a bracket 190. The threaded rod 208 passes through a hole in the bracket 190, and the bracket 190 is welded to the internal surface of the side covers 180 and 182 during assembly thereof. An access opening 212 is formed in the right-hand cover plate 182 for making adjustments of the sprocket 186 by way of the lock nut 210. An isometric view of the completely assembled in-feed assembly is shown in FIG. 13, with the access cover 214 removed to show the adjustment mechanism. Further, it can be seen that the square slide member 202 can be moved longitudinally in the slot 206 to provide take-up adjustment of the sprocket 186 and thereby loosen or tighten the conveyor chain 150. It is noted that the top portion of the left and right cover plates 180 and 182 are enclosed only on the top by metal 218 for protection which prevents small objects and the like from falling into the idler chain mechanism. Other spacer pegs can be welded or bolted between the protective cover plates 180 and 182 to maintain the plates securely spaced apart. As further noted in FIG. 13, an opening 220 exists between the span support 140 and the cover plates 180 and 182 for exit of the chain 150 so that it can ride on the top of the key stock 153 welded to the top of the span support 140 and thereby carry boards into the sawing system.

It is noted that the top flat surface 218 of the in-feed assembly provides a rest on which boards can be initially placed, without being moved by the chain 150. When it is desired to feed the board into the sawing system, the operator simply pushes the board from the surface 218 onto the open top of the protective cover plates 180 and 182, whereby the board is moved forwardly by the protruding dog-ear extensions 151. The board is then captured between the material conveyor 32 and the upper hold-down mechanism 34 and automatically fed to the left and right power saws by a controlled and uniform movement. The upright edge 222 of the in-feed assembly provides an edge to prevent boards from sliding off the assembly, due to its upward incline. While the right-hand material conveyor 32 has been described, it is noted that the left-hand material conveyor 44 is identically constructed in a mirror image.

The advantage of the in-feed assembly shown in FIGS. 10 and 11 is that such assemblies are very narrow, whereby the left material conveyor 44 can be placed adjacent to the right material conveyor 32 to thereby convey very short boards so that both ends thereof can be cut at desired angles by the power saws. Further, no external adjustment mechanism exists that could catch an operator's clothes or that can be covered with sawdust and the like to make adjustment difficult. Boards as short as nine inches can be cut with square angled ends, due to the feature of the in-feed assemblies which can be placed close together to support the short boards as they are carried into the sawing system. This is due also in part to the utilization of the cantilever bearings located on the outside of each material conveyor at the upper ends thereof, thereby allowing the conveyor assemblies to be of a very narrow width and located between opposing saws to cut short lengths of boards.

From the foregoing, the various component parts of an efficient sawing system are disclosed, with the enhanced capability of moving the power saws, as well as the in-feed material conveyors. With the provisions of the present invention, the various component parts can be manufactured in a more cost efficient manner, and require less maintenance without sacrificing precision or accuracy. Accordingly, various modifications may suggest themselves to those skilled in the art without departing from the spirit and scope of the invention, as defined by the appended claims. Also, those skilled in the art may prefer to utilize some of the features and advantages of the invention, without using all of the features. The invention is not to be restricted to the specific forms shown, or the uses mentioned, except as to the extent required by the claims.

What is claimed is:

1. A sawing system, comprising:
   a frame for supporting components of the sawing system, said frame having a back horizontal rail and a front horizontal rail, the back rail being elevated a distance greater than the front rail;

a first power saw carriage mounted to said frame and including at least two power saws for cutting stock fed to the sawing system;

a second power saw carriage movable along the front rail and back rail of the frame, and including at least two power saws that are mounted to said carriage and being movable therewith;

a hold-down mechanism associated with each said power saw carriage for exerting downward pressure on stock fed to the sawing system;

a pair of chain-driven material conveyors, each associated with a respective said first and second power saw carriages, and each supported on the back rail and on the front rail, whereby the material conveyors are angled upwardly from front to back, said material conveyors operating in conjunction with the hold-down mechanism for feeding stock to the power saws of the first and second power saw carriages;

a common square drive shaft coupled to both said material conveyors for driving a respective feed chain of each said material conveyor, and said material conveyors being movable on said frame while remaining driven by the common square drive shaft, each said material conveyor further including a square tubular drive member through which the square drive shaft passes for coupling the torque of the square drive shaft to the tubular drive member of each said material conveyor;

a chain take-up mechanism connected to a frontal portion of each said material conveyor, said take-up mechanism being enclosed between opposing side cover plates, and including means for adjusting a tension of the material conveyor chains via an access opening for accessing the take-up mechanism, whereby said material conveyors can be moved close together.

2. A sawing system comprising:

a material conveyor for moving lengths of wood stock, the lengths of wood stock being constrained and fixed on a conveying plane of the material conveyor as the material conveyor moves the lengths of wood stock through the sawing system; and a frame for supporting at least a first power saw and a second power saw on one side of the material conveyor and for supporting at least a third power saw and a fourth power saw supported on the opposite side of the material conveyor, wherein each of the first, second, third, and fourth power saws is supported for independent angular movement of its saw blade about a pivot axis that is offset from the plane of the saw blade and parallel to the direction of the movement of the lengths of wood stock on the material conveyor, wherein the pivot axis of the first power saw is positioned above the conveying plane of the material conveyor for making top angled cuts in the lengths of wood stock moved on the material conveyor, wherein the pivot axis of at least one of the first and second power saws is supported for horizontal movement relative to the material conveyor, wherein of the pivot axis of the third power saw is positioned above the conveying plane of the material conveyor for making top angled cuts in the lengths of wood stock moved on the material conveyor, and wherein the pivot axis of at least one of the third and fourth power saws is supported for horizontal movement relative to the material conveyor.

3. The sawing system according to claim 2, wherein the conveying plane of the material conveyor is angled upwardly from a frontal loading end thereof to facilitate the loading of wood stock thereon and to accommodate a disposal system below the power saws and the conveyor plane of the material conveyor.

4. The sawing system according to claim 2, wherein the material conveyor comprises: a first material conveyor and a second material conveyor, at least one of the first and second material conveyors being horizontally movable so that the sawing system can accommodate different lengths of wood stock.

5. The sawing system according to claim 2, wherein a suspension beam supports the first power saw from above such that the pivot axis of the first power saw is positioned above the conveying plane of the material conveyor.

6. The sawing system according to claim 2, wherein a suspension beam supports the third power saw from above such that the pivot axis of the third power saw is positioned above the conveying plane of the material conveyor.

7. The sawing system according to claim 2, wherein the first and second power saws are mounted on a horizontally movable carriage.

8. The sawing system according to claim 2, wherein a suspension beam supports the first power saw from above such that the pivot axis of the first power saw is positioned above the conveying plane of the material conveyor.

9. The sawing system according to claim 8, wherein the suspension beam is supported for horizontal movement relative to the movable carriage.

10. The sawing system according to claim 2, further comprising: a computer operatively connected to control the movements of the movable power saw carriage and the first, second, third, and fourth power saws; and a program for execution by the computer, the program having an algorithm for calculating a first correction factor for the horizontal position of the first or second power saw that is supported for horizontal movement so that it makes a cut through a first predefined point on a first end of the length of wood stock, and for calculating a second correction factor for the horizontal position of the third or fourth power saw that is supported for horizontal movement so that it makes a cut through a second predefined point on a second end of the length of wood stock.

11. The sawing system according to claim 10, wherein the algorithm for calculating the first correction factor for making top and bottom angled cuts through the first predefined point takes into account that a home position of the pivot axis of the first power saw is positioned above the conveying plane for making top angled cuts and that a home position of the pivot axis of the second power saws is positioned below the conveying plane for making bottom angled cuts, the algorithm for the first and second power saws being:

$$\text{Correction Factor} = \left[\frac{-2\sqrt{D_2^2 + h_2^2}\, \text{Sin}\left(\frac{\theta_2 - 90°}{2}\right)\text{Sin}\left(45° + \frac{\theta_2}{2} - \text{Tan}^{-1}\frac{D_2}{h_2}\right)}{\text{Sin}(180° - \theta_2)}\right] - \left[\frac{2\sqrt{D_1^2 + h_1^2}\, \text{Sin}\left(\frac{\theta_1 - 90°}{2}\right)\text{Sin}\left(135° - \frac{\theta_1}{2} - \text{Tan}^{-1}\frac{D_1}{h_1}\right)}{\text{Sin}\theta_1}\right]$$

where $D_1$ is the perpendicular distance between the pivot axis of the first power saw and the blade of the first power saw, $h_1$ is the vertical distance from the pivot axis of the first power saw to the first predefined point, $\theta_1$ is the angular position of the blade of the first power saw relative to the conveying plane of the material conveyor, D₂ is the distance between the pivot axis of the second power saw and the blade of the second power saw, h₂ is the vertical distance from the pivot axis of the second power saw to the first predefined point, and θ₂ is the angular position of the blade of the second power saw relative to the conveying plane of the material conveyor.

12. A sawing system comprising:

(a) a frame;

(b) a fixed power saw carriage supported on the frame;

(c) a movable power saw carriage supported on the frame for horizontal movement relative to the fixed power saw carriage;

(d) a material conveyor for moving lengths of wood stock, the lengths of wood stock being constrained and fixed on a conveying plane of the material conveyor as the material conveyor moves the lengths of wood stock through the sawing system; and (e) at least a first power saw and a second power saw supported on the movable power saw carriage, and at least a third power saw and a fourth power saw supported on the fixed power saw carriage, wherein each of the first, second, third, and fourth power saws is supported for independent angular movement of its saw blade about a pivot axis that is offset from the plane of the saw blade and parallel to the direction of the movement of the lengths of wood stock on the material conveyor between the fixed power saw carriage and the movable power saw carriage, wherein the pivot axis of the first power saw is positioned above the conveying plane of the material conveyor for making top angled cuts in the lengths of wood stock and the pivot axis of the second power saw is positioned below the conveying plane of the material conveyor for making bottom angled cuts in the lengths of wood stock, wherein the pivot axis of the third power saw is positioned above the conveying plane of the material conveyor for making top angled cuts in the lengths of wood stock and the pivot axis of the fourth power saw is positioned below the conveying plane of the material conveyor for making bottom angled cuts in the lengths of wood stock, wherein the pivot axis of at least one of the first and second power saws is supported for horizontal movement relative to the movable power saw carriage, and wherein at least one of the third and fourth power saws is supported for horizontal movement relative to the fixed power saw carriage.

13. The sawing system according to claim 12, wherein the conveying plane of the material conveyor is angled upwardly from a frontal loading end thereof to facilitate the loading of wood stock thereon and to accommodate a disposal system below the power saws and the conveyor plane of the material conveyor.

14. The sawing system according to claim 12, wherein the material conveyor comprises: a first material conveyor and a second material conveyor, at least one of the first and second material conveyors being horizontally movable so that the sawing system can accommodate different lengths of wood stock.

15. The sawing system according to claim 12, wherein a suspension beam supports the first power saw from above such that the pivot axis of the first power saw is positioned above the conveying plane of the material conveyor.

16. The sawing system according to claim 12, wherein a suspension beam supports the third power saw from above such that the pivot axis of the third power saw is positioned above the conveying plane of the material conveyor.

17. The sawing system according to claim 12, further comprising: a computer operatively connected to control the movements of the movable power saw carriage and the first, second, third, and fourth power saws; and a program for execution by the computer, the program having an algorithm for calculating a first correction factor for the horizontal position of the first or second power saw that is supported for horizontal movement relative to the movable power saw carriage so that it makes a cut through a first predefined point on a first end of the length of wood stock and for calculating a second correction factor for the horizontal position of the third or fourth power saw that is supported for horizontal movement relative to the fixed power saw carriage so that it makes a cut through a second predefined point on a second end of the length of wood stock.

18. The sawing system according to claim 17, wherein the algorithm for calculating the first correction factor for making top and bottom angled cuts through the first predefined point takes into account that a home position of the pivot axis of the first power saw is positioned above the conveying plane for making top angled cuts and that a home position of the pivot axis of the second power saws is positioned below the conveying plane for making bottom angled cuts, the algorithm for the first and second power saws being:

$$\text{Correction Factor} = \left[\frac{-2\sqrt{D_2^2 + h_2^2}\,\sin\left(\frac{\theta_2 - 90°}{2}\right)\sin\left(45° + \frac{\theta_2}{2} - \tan^{-1}\frac{D_2}{h_2}\right)}{\sin(180° - \theta_2)}\right] - \left[\frac{2\sqrt{D_1^2 + h_1^2}\,\sin\left(\frac{\theta_1 - 90°}{2}\right)\sin\left(135° - \frac{\theta_1}{2} - \tan^{-1}\frac{D_1}{h_1}\right)}{\sin\theta_1}\right]$$

where

D₁ is the perpendicular distance between the pivot axis of the first power saw and the blade of the first power saw, h₁ is the vertical distance from the pivot axis of the first power saw to the first predefined point, θ₁ is the angular position of the blade of the first power saw relative to the conveying plane of the material conveyor, D₂ is the distance between the pivot axis of the second power saw and the blade of the second power saw, h₂ is the vertical distance from the pivot axis of the second power saw to the first predefined point, and θ₂ is the angular position of the blade of the second power saw relative to the conveying plane of the material conveyor.

* * * * *

UNITED STATES PATENT AND TRADEMARK OFFICE
CERTIFICATE OF CORRECTION

PATENT NO.  : 5,943,239
DATED       : August 24, 1999
INVENTOR(S) : Wayne A. Shamblin and David L. McAdoo It is certified that error appears in the above-identified patent and that said Letters Patent is hereby corrected as shown below:

Column 1,
Line 58, after "parallel" insert -- to --;
Line 59, after "of" (first occurrence) delete -- to --;

Column 2,
Line 32, after "assembly" delete -- . --;

Column 5,
Line 60, after "22" insert -- , --;

Column 6,
Line 42, after "Thus" insert -- , --;
Line 43, change "can not" to -- cannot --;

Column 7,
Line 27, after "respectively" insert -- , --;

Column 9,
Line 24, delete "apparatus";

Column 10,
Line 4, delete ";" and insert -- , --;
Line 32, change "axis" to -- axes --;
Line 33, after "38" insert -- , --;
Line 46, change "axis" to -- axes --;

UNITED STATES PATENT AND TRADEMARK OFFICE
CERTIFICATE OF CORRECTION

PATENT NO. : 5,943,239
DATED : August 24, 1999
INVENTOR(S) : Wayne A. Shamblin and David L. McAdoo It is certified that error appears in the above-identified patent and that said Letters Patent is hereby corrected as shown below:

Column 12,
Line 43, change "the" to -- The --;

Column 13,
Line 8, change "±0.05" to -- ±0.05° --;

Column 18,
Line 21, change "claim 2" to -- claim 7 --.

Signed and Sealed this

Fourth Day of September, 2001

*Attest:*

NICHOLAS P. GODICI
*Attesting Officer*     Acting Director of the United States Patent and Trademark Office